United States Patent
Ginnings

(10) Patent No.: US 8,266,686 B1
(45) Date of Patent: Sep. 11, 2012

(54) SYSTEM AND METHOD FOR VOIP FIREWALL SECURITY

(75) Inventor: Christopher R. Ginnings, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1187 days.

(21) Appl. No.: 12/013,008

(22) Filed: Jan. 11, 2008

(51) Int. Cl.
*G06F 15/16* (2006.01)

(52) U.S. Cl. .................. 726/11; 726/1; 726/12; 726/13; 726/22; 713/154; 709/227; 709/228

(58) Field of Classification Search .................. 713/154; 726/1, 11, 12, 13, 22; 709/227, 228
See application file for complete search history.

(56) References Cited

U.S. PATENT DOCUMENTS

| | | | |
|---|---|---|---|
| 7,564,855 B1 * | 7/2009 | Georgiou | 370/401 |
| 7,756,120 B2 * | 7/2010 | Fieremans et al. | 370/352 |
| 7,778,268 B2 * | 8/2010 | Khan et al. | 370/435 |
| 7,787,478 B2 * | 8/2010 | Khouderchah et al. | 370/401 |
| 7,852,809 B2 * | 12/2010 | Oberle et al. | 370/331 |
| 7,865,612 B2 * | 1/2011 | Mallesan et al. | 709/239 |
| 2002/0161907 A1 * | 10/2002 | Moon | 709/230 |
| 2006/0047960 A1 * | 3/2006 | Ono et al. | 713/171 |
| 2007/0086432 A1 * | 4/2007 | Schneider et al. | 370/352 |
| 2008/0162720 A1 * | 7/2008 | Gulati et al. | 709/238 |
| 2008/0219241 A1 * | 9/2008 | Leinonen et al. | 370/352 |
| 2009/0025077 A1 * | 1/2009 | Trojanowski | 726/11 |

OTHER PUBLICATIONS

Session Border Controllers Enabling the voIP Revolution, Jon Hardwick, Metaswitch Networks, Feb. 2005, pp. 1-55.*
Snom 4S NAT Filter Version 2.11, snom technologies AG, Berlin Germany, 2004-2005, pp. 1-68.*

* cited by examiner

*Primary Examiner* — Carl Colin
*Assistant Examiner* — Mohammad Siddiqi

(57) ABSTRACT

Configuration data within a session border controller (SBC) is updated to support a new external node in an automatic fashion by a computer system. A user is prompted for an identity of a node external to the communication network that transfers the signaling, and a call processor internal to the communication network that receives and processes the signaling. The identities are then processed to select at least one session border controller (SBC), and configuration data is retrieved from the selected SBC. This configuration data from the selected is automatically updated to allow signaling from the external node to the call processor. Signaling received from the external node into the SBC, is then transferred the signaling to the call processor based on the updated configuration data.

24 Claims, 6 Drawing Sheets

SYSTEM AND METHOD FOR VOIP FIREWALL SECURITY

OVERVIEW

In a voice over internet protocol (VoIP) communication network, session border controllers (SBCs) are often used to filter traffic between a communication network and other networks. If these session border controllers receive messages that they are not configured to allow, they refuse the message. This prevents devices external to the communication network from tying up resources within the network with malicious messages. In this configuration the session border controller acts as a firewall to the communication network.

If a network user wishes to receive messages from a node external to the network, the session border controller must be configured to allow messages from that external node. Given the complexity and constant changes in the structure of the Internet and other external nodes, updating the SBCs is a tedious and ongoing challenge. If these session border controllers are incorrectly configured, they may refuse desired messages, or may allow messages from undesirable nodes.

TECHNICAL SUMMARY

A computer system updates configuration data within a session border controller (SBC) to support a new external node in an automatic fashion by the computer system. The computer system prompts a user for an identity of a node external to the communication network that transfers the signaling, and a call processor internal to the communication network that receives and processes the signaling. The identities are then processed to select at least one session border controller (SBC), and configuration data is retrieved from the selected SBC. This configuration data from the selected SBC is automatically updated to allow signaling from the external node to the call processor. Signaling received from the external node into the SBC, is then transferred to the call processor based on the updated configuration data.

DETAILED DESCRIPTION

Figure 1:
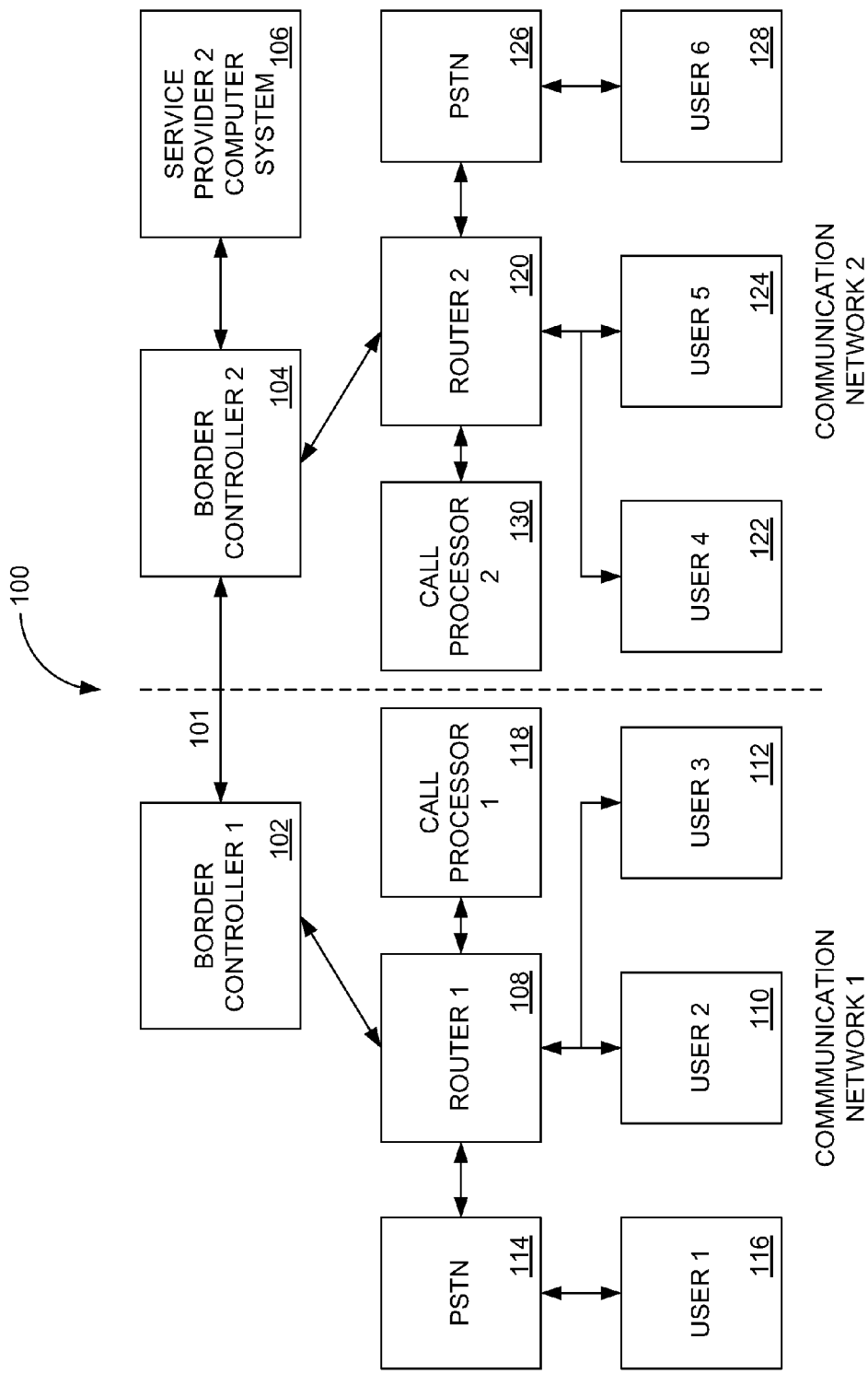
FIG. 1 is a block diagram illustrating a communication system.

FIG. 1 is a block diagram illustrating a communication system 100. In this example embodiment of a communication system 100 including two communication networks, a first session border controller (SBC) 102 and a second border controller 104 are coupled through a connection 101, such as a network, the Internet, or other equivalent connections. The first session border controller 102 is coupled to a first router 108. The first router 108 is coupled to a first call processor 118, a second user 110, a third user 112, and a first user 116 through the public switched telephone network (PSTN) 114.

The first session border controller 102, first router 106, and first call processor 118 comprise a first communication network. The second session border controller (SBC) 104 is coupled to a second router 120 and a second service provider computer system 106. The second router 120 is coupled to a second call processor 130, a fourth user 122, and a fifth user 124, and a sixth user 128 through the public switched telephone network 126. The second session border controller 104, second router 120, second service provider computer system 106, and second call processor 130 comprise a second communication network. Communication system 100 could take any of a wide variety of different configurations, including any number of users, routers, call processors, and other devices.

If connection 101 is established without updating the second SBC 104, the SBC 104 will block all traffic arriving from the first communication network via connection 101. It may be desirable to configure the second SBC 104 to allow all messages from the first communication network through connection 101. However, this might allow undesirable messages disguised as valid traffic from the first communication network into the second communication network. Thus, the second SBC 104 may be configured to further filter messages received through connection 101 to ensure that they are valid messages. This inspection and filtering may be accomplished by a variety of different techniques. For example, the second SBC 104 may inspect the headers of incoming messages for a valid source address and a valid destination address, and may block messages with invalid source or destination addresses. Some malicious messages may include spoofed source or destination addresses in an attempt to pass this filter. In order to detect these spoofed messages, the second SBC 104 may perform a deep packet inspection (DPI) on some or all messages received through connection 101. A deep packet inspection looks beyond the header information of message packets into the payloads of the incoming message packets. The second SBC 104 uses deep packet inspection filtering parameters to configure the type of DPI to be performed on incoming messages. These DPI filtering parameters may control which messages are selected for DPI and also to control what types of attacks the DPI will detect. This enables the second SBC 104 to detect messages containing viruses, worms, Trojan horses, or other malicious code, and to block those messages from entering the second communication network.

Still other embodiments may require authentication codes within headers or messages from the first communication network to indicate valid messages. In such an embodiment, the second SBC 104 is configured to check each message for a correct authentication code and block messages with invalid or missing authentication codes. Further embodiments may encrypt messages transferred over the connection 101 to prevent unauthorized viewing of the messages. In these embodiments the second SBC 104 is also configured with encryption and decryption keys allowing it to decrypt incoming messages, examine the message for validity and authenticity, then re-encrypt the message before placing it into the second communication network. Thus, configuration of the second SBC 104 may include such parameters as filtering parameters, DPI filtering parameters, authentication codes, and encryption and decryption keys, along with any other necessary parameters used to filter incoming messages.

Figure 2A:
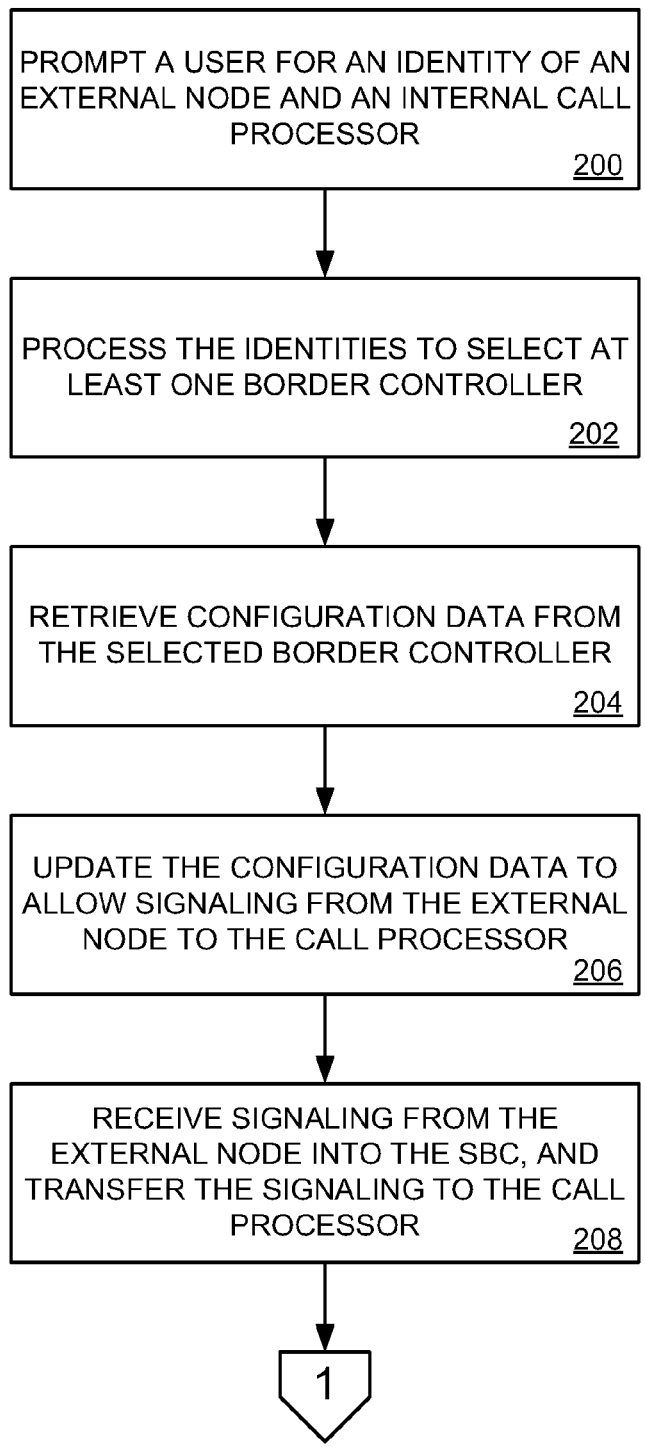
FIGS. 2(a) and 2(b) are flowcharts illustrating a method for automatically configuring a communication network to accept telecommunication signaling.
Figure 2B:
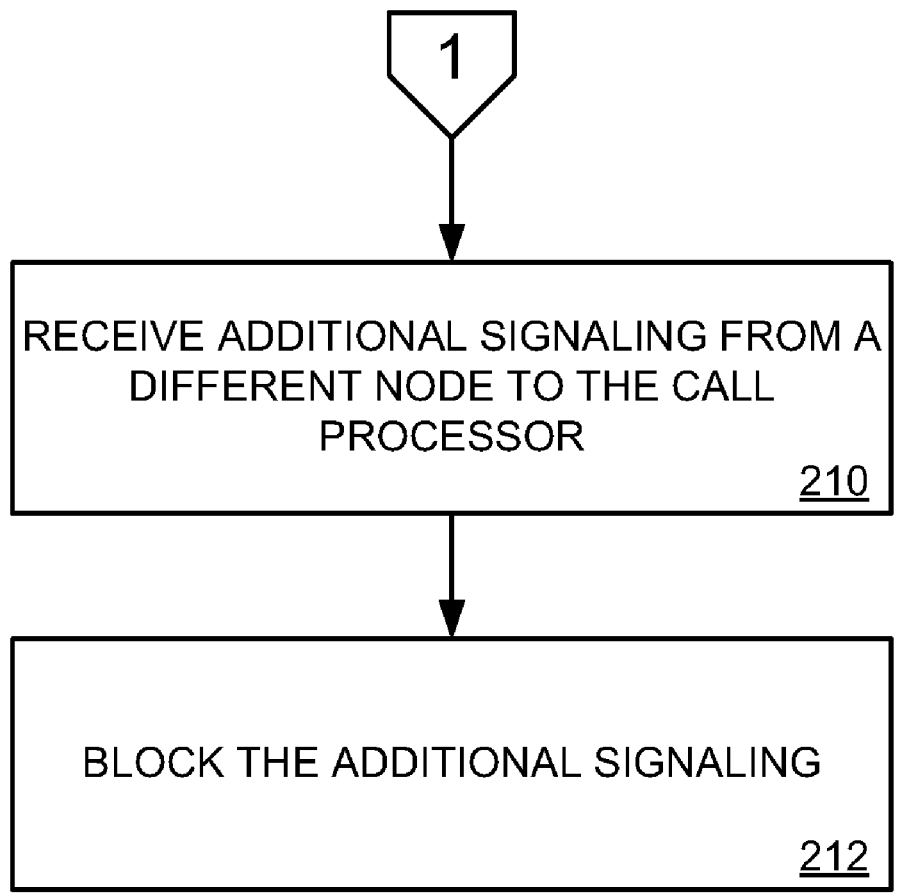
Figure 4:
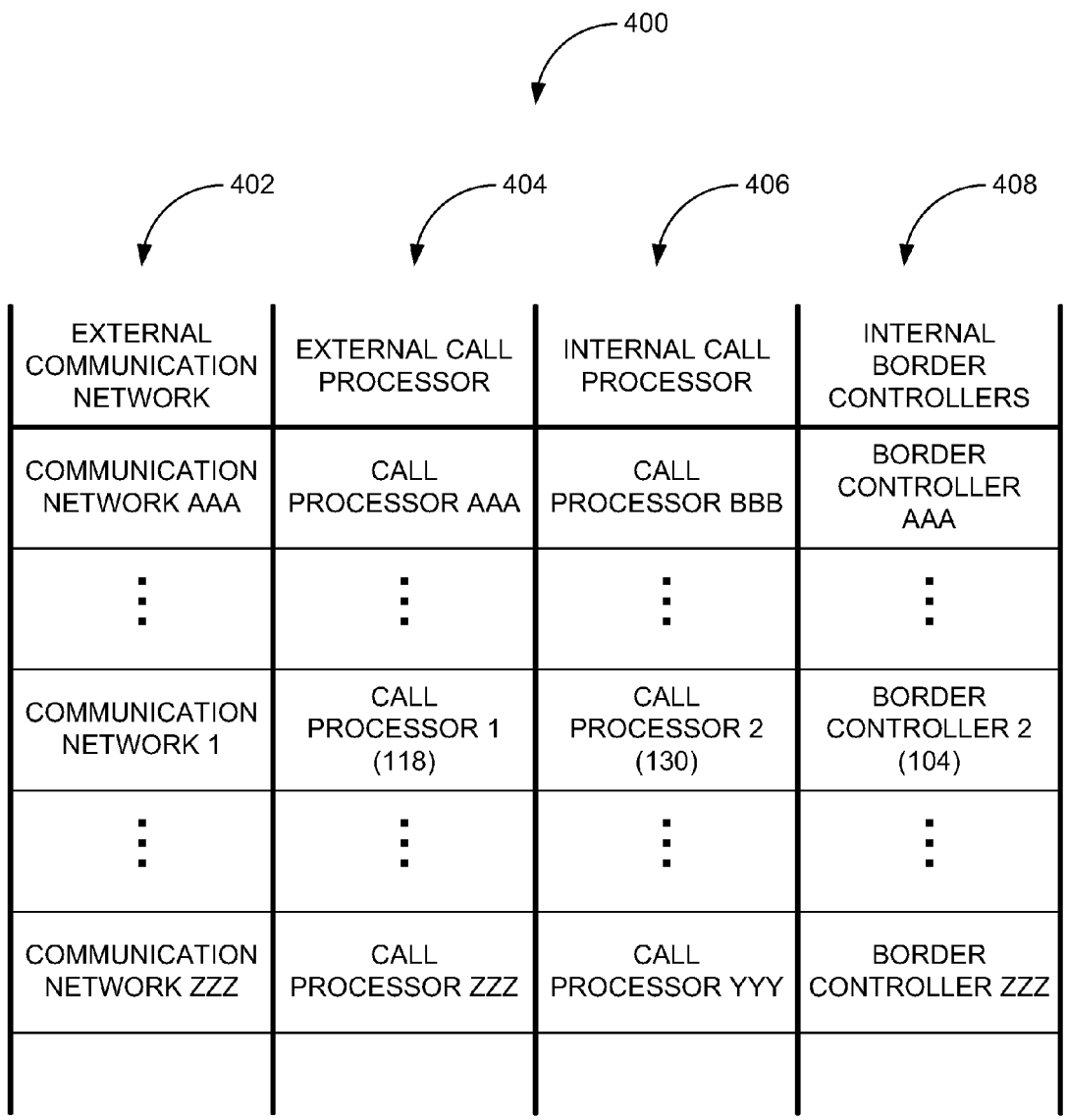
FIG. 4 is a configuration table for use in automatically configuring a communication network to accept telecommunication signaling.

FIGS. 2(a) and 2(b) are flowcharts illustrating a method for automatically configuring a communication network to accept telecommunication signaling. Reference numbers from FIGS. 2(a) and 2(b) are indicated parenthetically below. Computer system 106 prompts a user for an identity of a node external to the communication network that transfers the signaling (this identity may include an identity of an external communication network, and a call processor within the external communication network), and an identity of a call processor internal to the communication network that receives and processes the signaling, (operation 200). For example, computer system 106 may provide a network map showing call processors and external networks, allowing a user to identify the external node and the internal call processor. Computer system 106 processes the identities of the external node and the internal call processor to select at least one session border controller (SBC) for updating, (operation 202). In some embodiments, computer system 106 may contain a configuration table containing a list of external communication network identities, external call processors, internal call processors, and the internal SBCs corresponding to these connections. These configuration tables may be created in advance by communication network engineers, such that users will not be required to determine which SBCs must be updated for any given connection. This allows relatively less skilled workers to update configurations within the correct SBCs without requiring highly skilled network engineers to make such determinations on a case-by-case basis. FIG. 4 illustrates an example configuration table, and is described in detail below.

Computer system 106 then retrieves configuration data from the selected session border controller, (operation 204). As discussed above, this configuration data from the SBC may include a wide variety of parameters and other data used for filtering incoming messages. The types and quantities of this configuration data may vary between differing SBCs. Next, computer system 106 automatically updates the configuration data to allow signaling from the node external to the communication network that transfers the signaling to the call processor internal to the communication network that receives and processes the signaling, (operation 206). The second SBC 104 receives signaling from the external node, and then transfers the signaling to the call processor 130 if the signaling successfully passes the filtering within the SBC 104 as established by the updated configuration parameters, (operation 208). The SBC 104 may receive additional signaling from a different external node to the internal call processor 130, (operation 210). The SBC 104 then blocks this additional signaling since the configuration data within the SBC 104 has not been updated to allow signaling from this different external node, or if the message does not meet the requirements of the filtering within the SBC 104, (operation 212).

Figure 3:
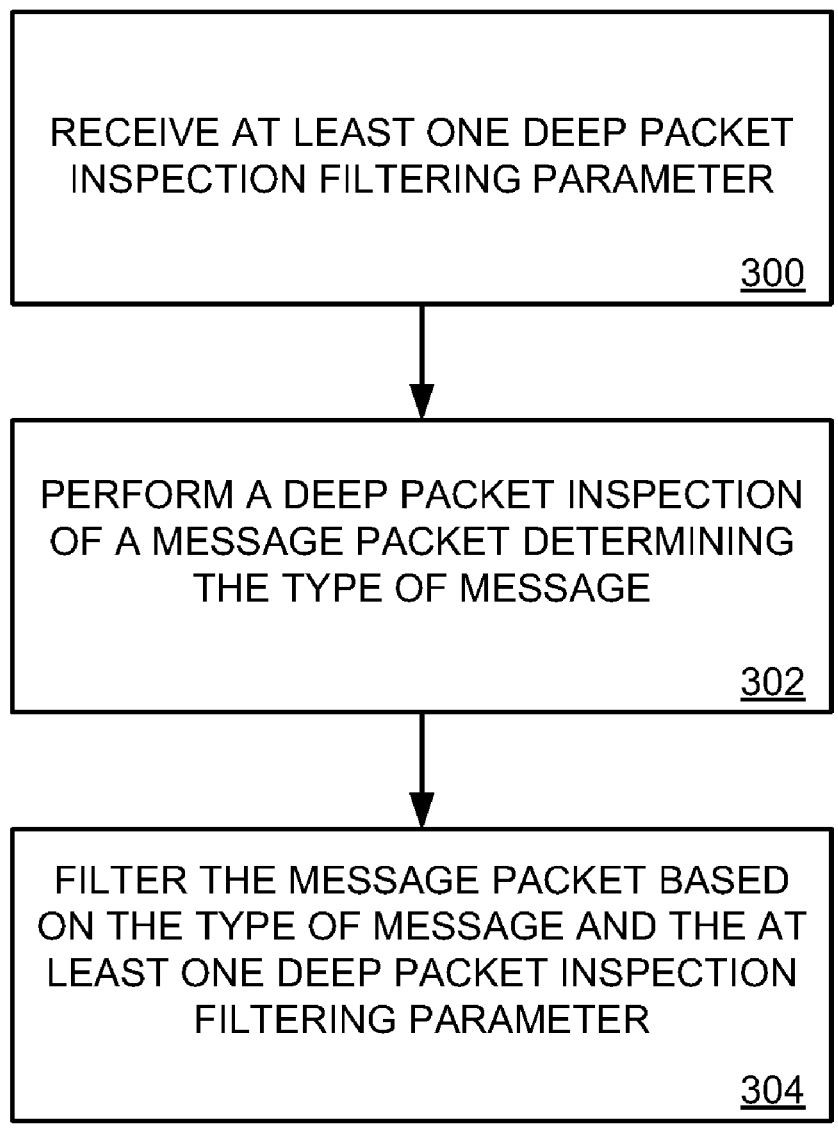
FIG. 3 is a flowchart illustrating a method for automatically configuring a communication network to accept telecommunication signaling.

FIG. 3 is a flowchart illustrating a method for automatically configuring a communication network to accept telecommunication signaling. In some embodiments it may be desirable to allow only certain types of messages, or to inspect message bodies for malicious material. In these embodiments, a deep packet inspection may be performed on packets received by a SBC, and the packets may be accepted or rejected based on the allowed types of messages and the message type found by the deep packet inspection. The SBC receives configuration data including at least one deep packet inspection filtering parameter, (operation 300). The SBC then performs a deep packet inspection on an incoming message packet, determining if the message meets the filtering parameters, (operation 302). The SBC then filters the message packet based on the type of message and the at least one deep packet inspection filtering parameter, (operation 304). If the incoming message packet fails the DPI, it is blocked by the SBC.

FIG. 4 is a configuration table 400 for use in automatically configuring a communication network to accept telecommunication signaling. As discussed with respect to FIG. 1, the operation of determining which SBCs require configuration updates when a new connection 101 is established between two communication networks may be a difficult task. In some embodiments, it is advantageous to include configuration tables 400 on the computer system 106, enabling the rapid selection of the correct SBCs. In this example configuration table 400, four columns of data are present. This example table 400 includes configuration data representing the example of FIG. 1 discussed above. A first column 402 comprises a list of external communication networks that may be expected to be connected to the internal communication network at some point in time. This column 402 contains an identity of communication network 1 from FIG. 1. A second column 404 comprises a list of external call processors within these external communication networks. This column 404 contains an identity of call processor 1 118 from FIG. 1. A third column 406 comprises a list of internal call processors within the internal communication network. This column 406 contains an identity of call processor 2 130 from FIG. 1. A fourth column 408 comprises a list of session border controllers within the internal communication network. This column 408 contains an identity of session border controller 2 108 from FIG. 1. When a new connection between an external communication network and the internal communication network is established, a user may consult this table on computer system 106. The user provides an identity of the external communication network, and the identities of the external call processor and the internal call processor that are to be connected. The computer system 106 uses these identities to determine the proper session border controllers that require updating from the configuration table 400.

Figure 5:
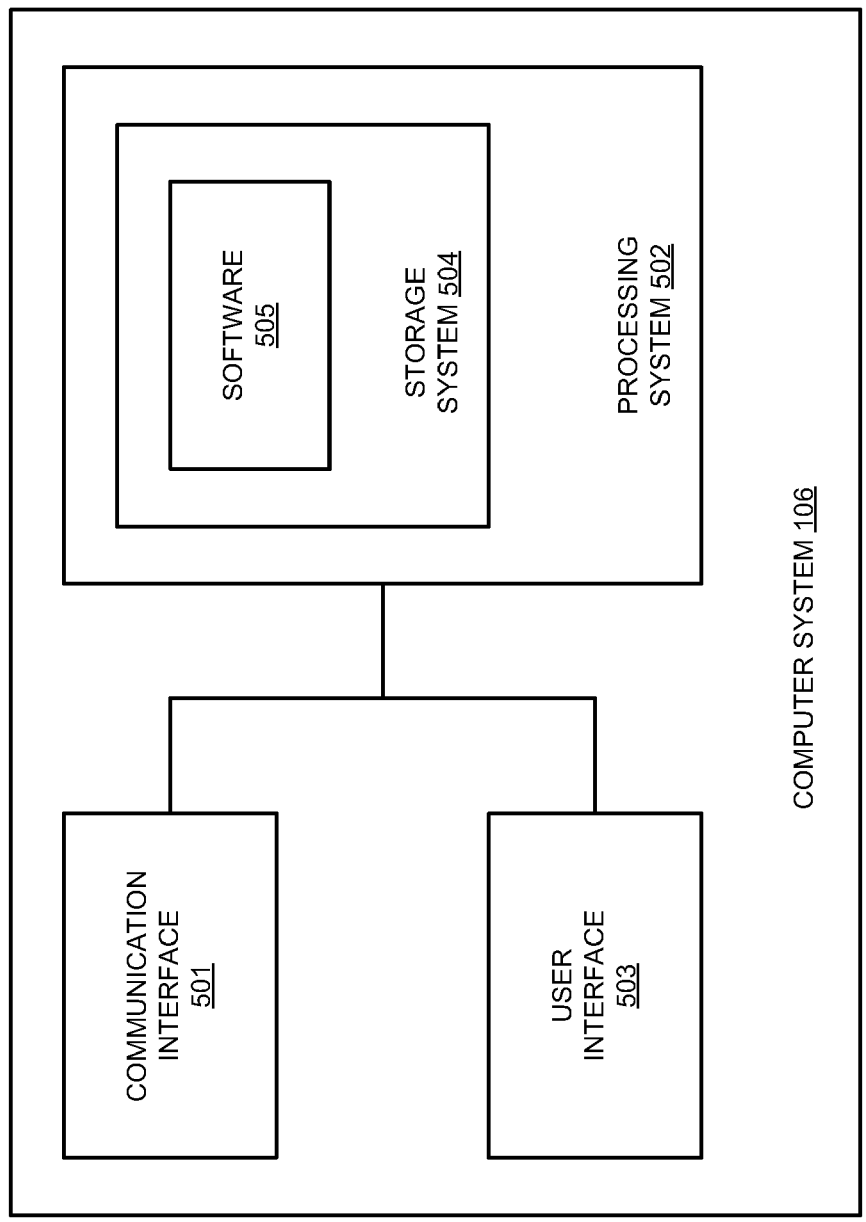
FIG. 5 is a block diagram illustrating a computer system.

FIG. 5 illustrates a block diagram of computer system 106. Computer system 106 includes communication interface 501, processing system 502, and user interface 503. Processing system 502 includes storage system 504. Storage system 504 stores software 505 and any configuration tables 400. Processing system 502 is linked to communication interface 501 and user interface 503. Computer system 106 could be comprised of a programmed general-purpose computer, although those skilled in the art will appreciate that programmable or special purpose circuitry and equipment may be used. Computer system 106 may be distributed among multiples devices that together comprise elements 501-505.

Communication interface 501 could comprise a network interface, modem, port, transceiver, or some other communication device. Communication interface 501 may be distributed among multiple communication devices. Processing system 502 could comprise a computer microprocessor, logic circuit, or some other processing device. Processing system 502 may be distributed among multiple processing devices. User interface 503 could comprise a keyboard, mouse, voice recognition interface, microphone and speakers, graphical display, touch screen, or some other type of user device. User interface 503 may be distributed among multiple user devices. Storage system 504 could comprise a disk, tape, integrated circuit, server, or some other memory device. Storage system 504 may be distributed among multiple memory devices.

Processing system 502 retrieves and executes software 505 from storage system 504. Software 505 may comprise an operating system, utilities, drivers, networking software, and other software typically loaded onto a computer system. Software 505 could comprise an application program, firmware, or some other form of machine-readable processing instructions. When executed by processing system 502, software 505 directs processing system 502 to operate computer system 106 as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for automatically configuring a communication network to accept telecommunication signaling, comprising:
   prompting a user for an identity of a node external to the communication network that transfers the signaling and an identity of a call processor internal to the communication network that receives and processes the signaling;
   processing the identity of the external node and the identity of the call processor to select at least one session border controller (SBC);
   retrieving configuration data for the selected SBC from the selected SBC;
   automatically updating the configuration data from the selected SBC to allow signaling from the external node to the call processor;
   receiving the updated configuration data in the selected SBC; and
   receiving signaling from the external node into the SBC, and transferring the signaling to the call processor based on the updated configuration data.

2. The method of claim 1, further comprising:
   receiving additional signaling from a different node to the call processor, and blocking the signaling based on the configuration data.

3. The method of claim 1, further comprising:
   retrieving configuration data from a second border controller; and
   automatically updating the configuration data from the second border controller to allow signaling from the external node to the call processor.

4. The method of claim 1, wherein the signaling comprises session initiation protocol (SIP) signaling, and the communication network is a voice over internet protocol (VoIP) network.

5. The method of claim 1, wherein automatically updating configuration data comprises allowing a specific type of signaling and blocking all other types of signaling.

6. The method of claim 1, wherein automatically updating configuration data comprises updating allowable source addresses and destination addresses.

7. The method of claim 1, wherein automatically updating configuration data comprises updating authentication codes.

8. The method of claim 1, wherein automatically updating configuration data comprises updating encryption and decryption keys.

9. The method of claim 1, further comprising:
   receiving at least one deep packet inspection filtering parameter;
   performing a deep packet inspection of a message packet determining the type of message; and
   filtering the message packet based on the type of message and the at least one deep packet inspection filtering parameter.

10. A communication system comprising:
    a communication network including:
       a plurality of session border controllers (SBCs); and
       a plurality of call processors; and
    a computer system coupled to the communication network, configured to:
       prompt a user for an identity of a node external to the communication network that transfers the signaling and an identity of a call processor internal to the communication network that receives and processes the signaling;
       process the identity of the external node and the identity of the call processor to select at least one session border controller from the plurality of session border controllers;
       retrieve configuration data for the selected SBC from the selected SBC; and
       automatically update the configuration data from the selected SBC to allow signaling from the external node to the call processor;
       wherein the selected SBC is configured to receive the updated configuration data in the selected SBC, receive signaling from the external node, and transfer the signaling to the call processor based on the updated configuration data.

11. The communication system of claim 10, wherein the selected SBC is further configured to receive additional signaling from a different node to the call processor, and blocking the signaling.

12. The communication system of claim 10, wherein the selected SBC is further configured to allow a specific type of signaling and block all other types of signaling.

13. The communication system of claim 10, wherein the configuration data includes allowable source addresses and destination addresses.

14. The communication system of claim 10, wherein the configuration data includes authentication codes.

15. The communication system of claim 10, wherein the configuration data includes encryption and decryption keys.

16. The communication system of claim 10, wherein the selected SBC is further configured to:
    receive at least one deep packet inspection filtering parameter;
    perform a deep packet inspection of a message packet determining the type of message; and
    filter the message packet based on the type of message and the at least one deep packet inspection filtering parameter.

17. A non-transitory computer-readable medium of instructions for automatically configuring a communication network to accept telecommunication signaling, wherein the instructions, when executed by the communication network, direct the communication network to:
    prompt a user for an identity of a node external to the communication network that transfers the signaling and an identity of a call processor internal to the communication network that receives and processes the signaling;
    process the identity of the external node and the identity of the call processor to select at least one session border controller (SBC);
    retrieve configuration data from the selected SBC;
    automatically update the configuration data from the selected SBC to allow signaling from the external node to the call processor;
    receive the updated configuration data in the selected SBC; and
    receive signaling from the external node into the SBC, and transferring the signaling to the call processor based on the updated configuration data.

18. The non-transitory computer-readable medium of instructions of claim 17, further comprising instructions directing the communication network to receive additional signaling from a different node to the call processor and block the signaling.

19. The non-transitory computer-readable medium of instructions of claim 17, further comprising instructions directing the communication network to allow a specific type of signaling and block all other types of signaling.

20. The non-transitory computer-readable medium of instructions of claim 17, further comprising instructions directing the communication network to:
- receive at least one deep packet inspection filtering parameter;
- perform a deep packet inspection of a message packet determining the type of message; and
- filter the message packet based on the type of message and the at least one deep packet inspection filtering parameter.

21. A computer system comprising:
- a processing system;
- a user interface, coupled to the processing system; and
- a communication interface, coupled to the processing system and to a communication network including a plurality of session border controllers (SBCs), and a plurality of call processors;
- wherein the user interface is configured to prompt a user for an identity of a node external to the communication network that transfers the signaling and an identity of a call processor internal to the communication network that receives and processes the signaling;
- wherein the processing system is configured to:
  - process the identity of the external node and the identity of the call processor to select at least one session border controller;
  - retrieve configuration data from the selected SBC; and
  - automatically update the configuration data from the selected SBC to allow signaling from the external node to the call processor; and
- wherein the selected SBC is configured to receive the updated configuration data in the selected SBC, receive signaling from the external node, and transfer the signaling to the call processor based on the updated configuration data.

22. The computer system of claim 21, wherein the processing system is further configured to receive additional signaling from a different node to the call processor, and blocking the signaling.

23. The computer system of claim 21, wherein the selected SBC is further configured to allow a specific type of signaling and block all other types of signaling.

24. The computer system of claim 21, wherein the selected SBC is further configured to:
- receive at least one deep packet inspection filtering parameter;
- perform a deep packet inspection of a message packet determining the type of message; and
- filter the message packet based on the type of message and the at least one deep packet inspection filtering parameter.

* * * * *